(12) United States Patent
Schrafel

(10) Patent No.: US 6,666,491 B2
(45) Date of Patent: Dec. 23, 2003

(54) TAILGATE LOCK-OPEN MECHANISM

(75) Inventor: Tracy Schrafel, West Concord, MN (US)

(73) Assignee: McNeilus Truck and Manufacturing, Inc., Dodge Center, MN (US)

( * ) Notice: Subject to any disclaimer, the term of this patent is extended or adjusted under 35 U.S.C. 154(b) by 0 days.

(21) Appl. No.: 09/951,226

(22) Filed: Sep. 13, 2001

(65) Prior Publication Data

US 2003/0047956 A1 Mar. 13, 2003

(51) Int. Cl.[7] .............................................. B62D 33/027
(52) U.S. Cl. ........................................ 296/56; 298/23 S
(58) Field of Search ...................... 296/56; 298/23 MD, 298/23 S, 23 M; 414/525.5, 519

(56) References Cited

U.S. PATENT DOCUMENTS

| | | | |
|---|---|---|---|
| 3,254,919 A | * | 6/1966 | Birchmeier ........... 298/23 MD |
| 4,371,306 A | | 2/1983 | Smith |
| 4,522,551 A | | 6/1985 | Henneberry |
| 4,552,500 A | | 11/1985 | Ghibaudo et al. |
| 4,890,703 A | * | 1/1990 | Hathaway ................... 188/300 |
| 5,145,305 A | | 9/1992 | Green |
| 5,158,340 A | | 10/1992 | Boda |
| 5,816,766 A | | 10/1998 | Clark |
| 6,123,497 A | | 9/2000 | Duell et al. |
| 6,234,739 B1 | | 5/2001 | Smith et al. |

* cited by examiner

Primary Examiner—Dennis H. Pedder
Assistant Examiner—Hillary L. Gutman
(74) Attorney, Agent, or Firm—Nikulai & Mersereau, P.A.; C. G. Mersereau

(57) ABSTRACT

A tailgate lock-open system is provided in the form of a locking system for each tailgate opening cylinder of a rear discharging refuse collection truck body with a top hinged pivoting tailgate and having fluid-operated cylinders connected between the refuse collection body and the tailgate in which extension of the cylinder rods swings open the tailgate. The locking system includes a locking collar that can be advanced to a locking position in which it fits over a portion of a cylinder rod and has a length that determines a minimum rod extension distance. An operating assembly is provided for advancing and withdrawing the locking collar from the corresponding cylinder rod.

16 Claims, 6 Drawing Sheets

TAILGATE LOCK-OPEN MECHANISM

BACKGROUND OF THE INVENTION

I. Field of the Invention

The present invention relates generally to truck bodies and primarily truck bodies dedicated by design to the collection, storage and discharge of refuse which are of a rear discharging type and are provided with a vertically, pivoting rear tailgate. These bodies include rear-loading, front-loading and many side-loading collecting models.

II. Related Art

Rear discharging refuse collection vehicle bodies of all types in the class of interest include one or more generally hollow storage compartments and are characterized by a rather large, heavy top pivoting tailgate assembly. The tailgate in the normal or closed position covers the aft portion of the storage compartment and is typically top hinged to pivot open and clear of the aft portion of the storage compartment to allow complete discharge of the contents without interference. Discharge is typically accomplished by a hydraulically-operated ejection blade which uses a long rearward directed power stroke to sweep the contents out through the open end of the storage compartment while the tailgate is fully opened.

The tailgate is normally opened by the combined efforts of a pair of oppositely disposed single-acting hydraulic cylinders which are connected between the sides of the truck body and the corresponding sides of the tailgate such that when the cylinder rods are fully extended, the tailgate is fully open.

FIG. 1 depicts a fragmentary view of the aft portion of a typical prior art rear-loading refuse vehicle generally at 10 in which the rear-loading refuse truck body 11 is carried by a heavy truck chassis 12 which may be of a conventional class of refuse-hauler chassis and includes a steerable front axle assembly complete with wheels, etc., which are well known and need not be illustrated for present purposes. The tailgate assembly as shown at 13 is cantilevered and extends a distance behind the rear wheels (14). The tailgate assembly is drawn in a closed position and alternatively illustrated in a fully open or refuse discharge position in phantom. As can be seen from FIG. 1, the tailgate assembly is a relatively large, heavy and cumbersome mechanism which also forms the closure to the refuse storage compartment of the truck body. The tailgate section 13 includes rather heavy, substantially vertical primary structural members on each side as at 15 by means of which the tailgate section is hinged to pivot about a pair of large pivot pins at 16. The tailgate assembly consists of a plurality of structural brace members connected by welded sheets to form a rather substantial structure. A pair of manually-operated latching mechanisms are provided, one of which is shown at 23.

The refuse storage compartment itself is of a well-known type and includes a compacting system operated by a pair of spaced cylinders, one of which appears at 17 and an ejection plate (not shown) which, during collection efforts, serves as a reaction member against which the refuse placed initially in the tailgate is compacted. The ejection plate is moved toward the front of the truck body by the pressure of accumulating compacted refuse which exceeds the resistance of the blade until it reaches the forward end when the storage container is filled. Thereafter, during the discharge sequence, a hydraulic ejection system is operated that serves to reverse the process forcing the blade rearward to sweep the entire truck body clean from fore to aft. This system is activated when the tailgate assembly is complete raised to accomplish discharge of the refuse at a landfill.

The tailgate assembly itself is opened or raised by a pair of single-acting hydraulic cylinders, one of which is shown at 22, and includes a cylinder rod 18, pivotal rod end connection 19 connected to the tailgate frame and a pivotal blind end connection connected to the main container body strut 20 which abuts tailgate strut 21 when the tailgate is fully closed.

During inspection and many maintenance routines, the tailgate raising cylinders may be partially extended (normally the tailgate is opened about one-fourth of the way) and blocking devices inserted between the tailgate assembly and the open truck body container to proclude the possibility of any unscheduled closure of the tailgate as by loss of hydraulic pressure. Such devices may be in the form of pivoting strut members connected to the tailgate which have free ends received in recesses provided in the truck body structure or other members positioned manually by workers. These devices have been used successfully in the past to prop-open tailgates. However, additional positive locking devices associated with the tailgate operating mechanism itself, deployable to positively prevent retraction of the cylinder rods during those times when it is necessary that the tailgate be maintained in a partially opened position would be a highly desirable addition.

SUMMARY OF THE INVENTION

By means of the present invention, there is provided a manually operable system associated with each tailgate operating cylinder that deploys a locking insert member or locking collar assembly between the rod end of the cylinder and the rod end-tailgate pivot connection member to prevent further retraction of the cylinder rod when the locking collar assembly is wedged in place. The locking collar assembly is pivotally mounted to the tailgate toward one end and operated manually using an extended operating rod and handle system member pivotally attached toward the other end of the member so as to pivot it in and out of place. A locking system holds the handle in position (and so the collar) when the collar is deployed prior to lowering the tailgate to wedge both collars in place.

The locking member may take the general form of an elongated collar having an open end and side directed toward the cylinder and rod and which, when pivoted into position, fits over and captures an extended portion of the rod with the proximal portion then extending through the opening in the end of the collar to the point where it emerges from the rod end of the cylinder, the side and end gaps being greater than the diameter of the cylinder rod but less than that of the outer diameter of the cylinder. The interior of the collar may be provided with contact buttons of a non-abrasive plastic material such as nylon, in places to prevent any damage to the cylinder rod by scratching of the surface. When the tailgate is lowered slightly, the cylinders retract, and each locking insert collar becomes wedged along the rod between the rod end connection to the tailgate and the rod end of the cylinder, thereby preventing further retraction of the rod into the cylinder.

The handle is provided with a pin system which can be utilized to support or lock the handle with the collar in both the locked and withdrawn positions, although the locking collar member will not dislodge from the wedged or locked position until the cylinder rod is again extended to release the locking member, the pin is thereafter manually removed and the handle used to retract the operating rod and pivot the blocking member away from the cylinder rod. In this manner, a locking member can be pivoted in and out of position on either side of the tailgate as desired to maintain the partially open position of the tailgate. The tailgate lock-open mechanism of the invention is designed readily retrofit on existing systems. The system is designed to serve as a primary positive closure preventing device, but preferably devices already provided or available should be used in conjunction with the system to provide the added safety of a redundant system.

BRIEF DESCRIPTION OF THE DRAWINGS

In the drawing figures wherein like numerals are utilized to designate like parts throughout the same.

DETAILED DESCRIPTION

The detailed description depicts a specific form of the present invention with respect to a rear-loading refuse body, however, it will be understood that this is meant to be representative of and by no means limiting or exhaustive with respect to the scope of the invention as it is contemplated that other large tailgate doors associated with front and certain side-loading vehicles also could be used. These adaptations are sufficiently similar so that it is believed that the teachings herein would clearly be adequate for one skilled in the art to utilize the concept of the invention on any of these systems in which a large tailgate needs to be unlatched and raised for dumping or discharge and partially raised for maintenance and inspection work.

Figure 1:
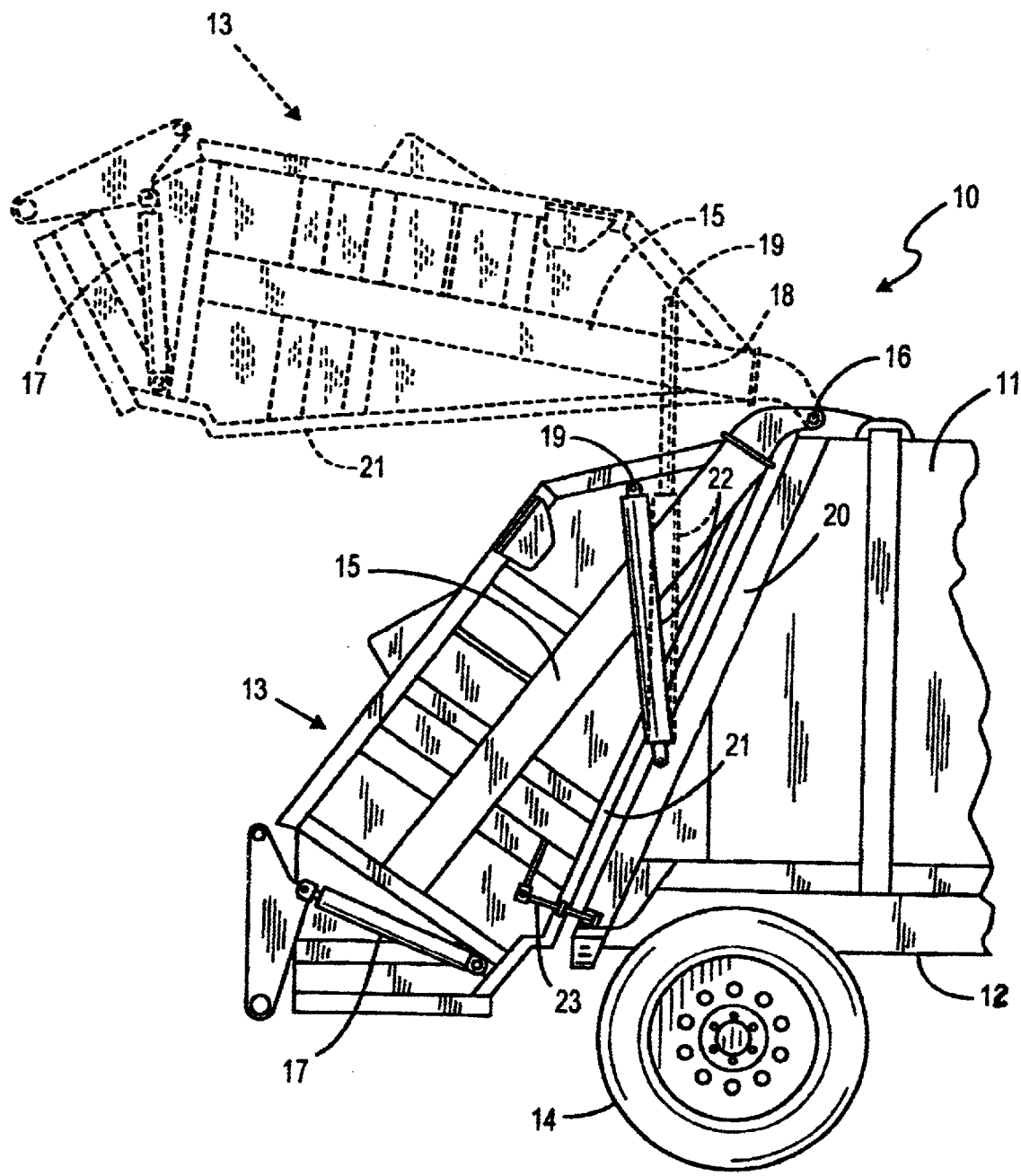
FIG. 1 is a fragmentary view of the rear portion of a typical rear-loading refuse vehicle equipped with tailgate raising and lowering cylinders and showing the alternate raised and lowered or closed positions of the tailgate assembly.
Figure 2:
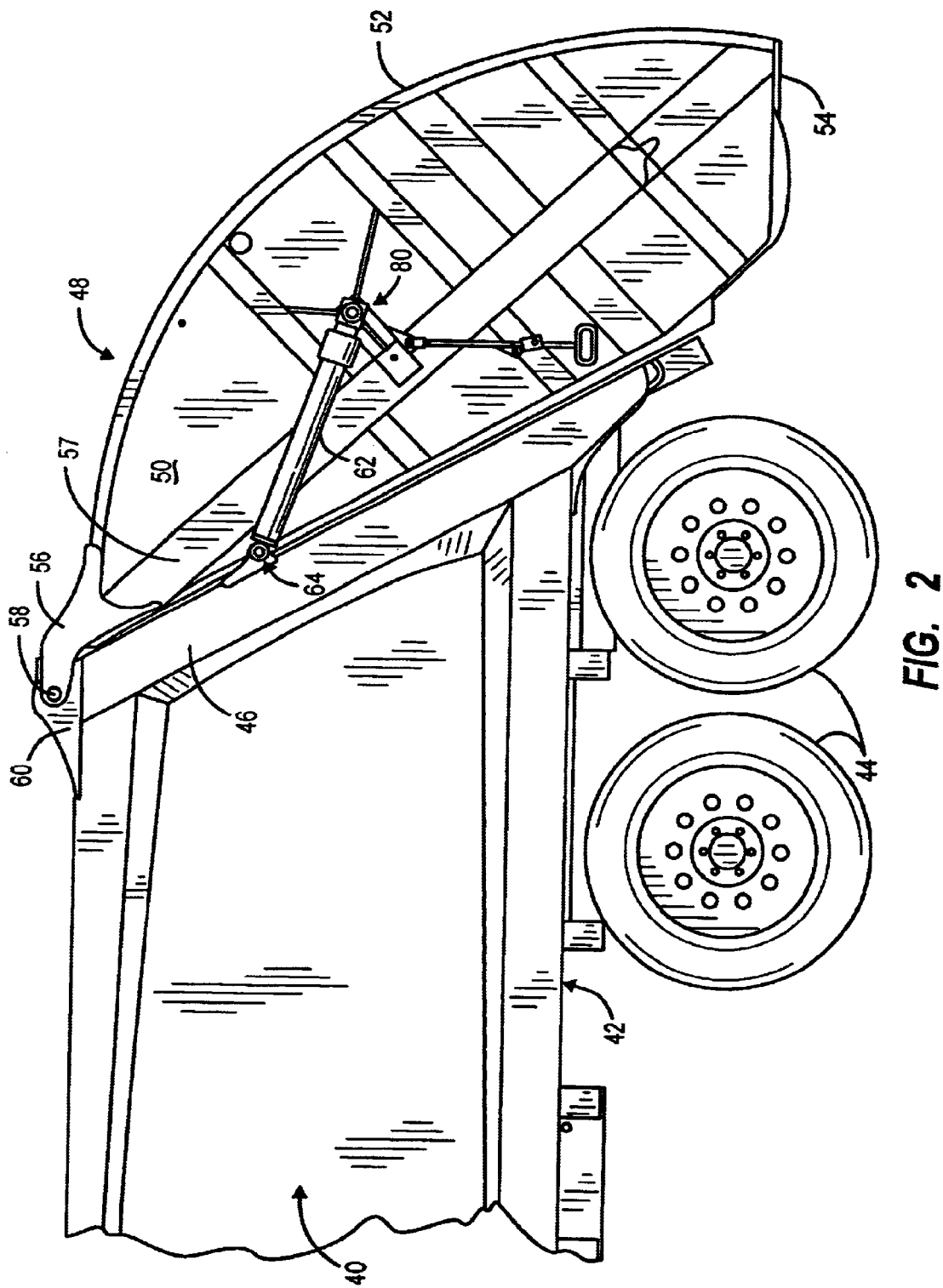
FIG. 2 is an enlarged fragmentary view of the rear portion of a rear loading refuse vehicle equipped with the tailgate lock-open mechanism of the invention shown in the closed position with the locking collar disengaged.

FIG. 2 is an enlarged fragmentary view of a rear-loading refuse vehicle equipped with the lock-open mechanism of the present invention and includes a partial view of a conventional refuse containing storage body 40 mounted on a chassis 42, in turn, carried by wheels 44. The aft portion of the truck body 40 includes a peripheral frame of heavy structural members, one of which is shown at 46, which support a large heavy tailgate assembly 48 consisting of spaced, re-enforced sides as at 50, a top outer shell plate 52 and a bottom plate 54. The tailgate 48 is mounted to the truck body 40 using a pair of spaced heavy re-enforced hinge members, one of which is shown at 56, connected to primary vertical structural members 57. The hinge members pivot on heavy shafts 58 in mounting blocks 60. It will be noted with respect to the descriptions herein that whereas side views are used and only one system may be depicted, the opposite or far side of the tailgate contains an identical, oppositely disclosed mechanism and the two are designed to be deployed or retracted as a pair.

The tailgate is opened and closed by a pair of side-mounted hydraulic cylinders as at 62, each having a blind end pivotally attached to the truck frame using a well-known clevis and pin pivot arrangement as at 64 and a piston rod 66 having a distal end threaded onto a T-sleeve 68 (FIG. 4) which, in turn, is carried to pivot about bearings or bushings 70 on a shaft 72. A collar 74 is provided at the rod end of the cylinder and a gland nut at 75.

Figure 3:
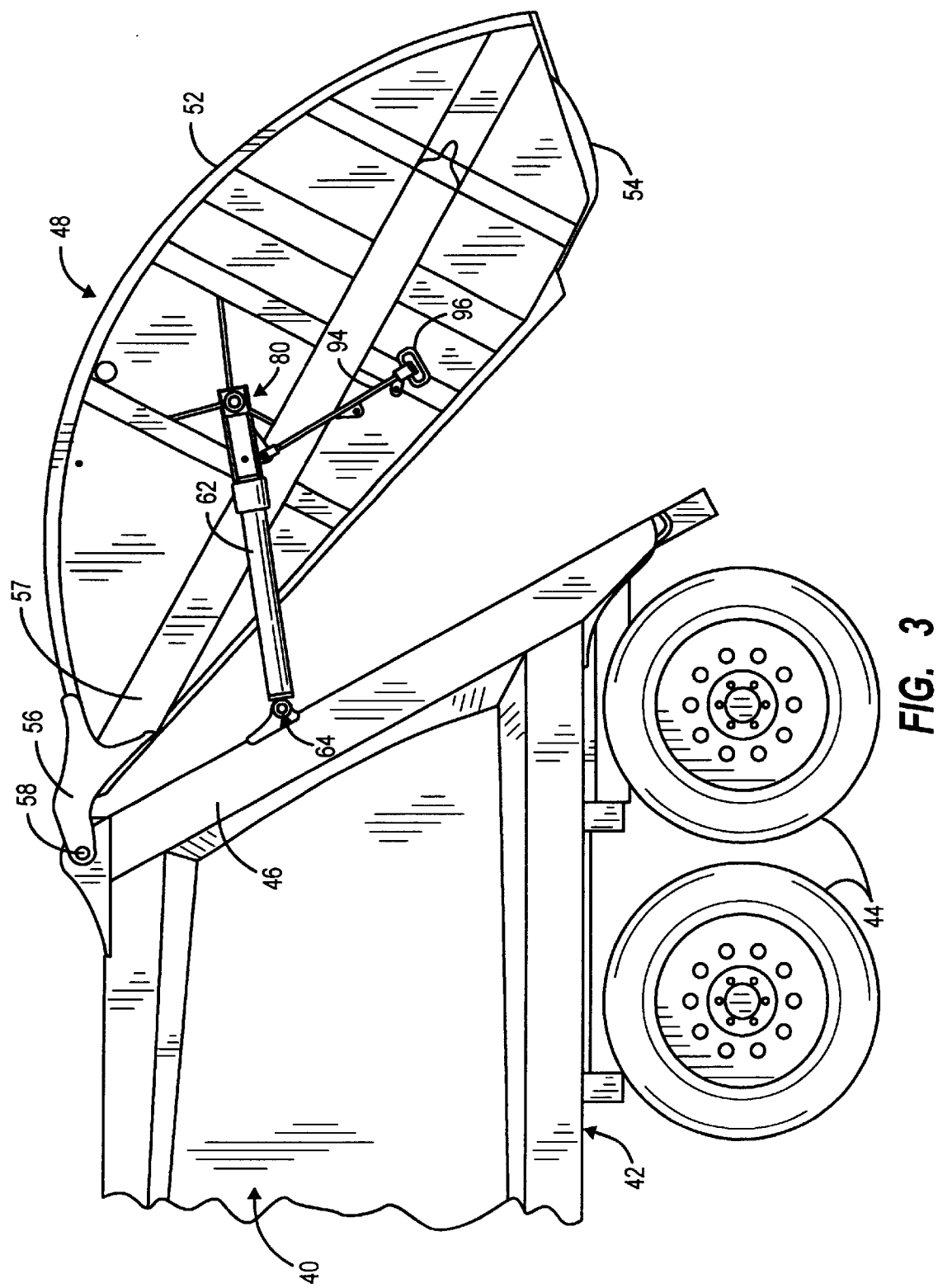
FIG. 3 is a view similar to that of FIG. 2 showing the tailgate in the partially opened position and the tailgate lock-open mechanism deployed with the collar fully wedged in place.
Figure 4:
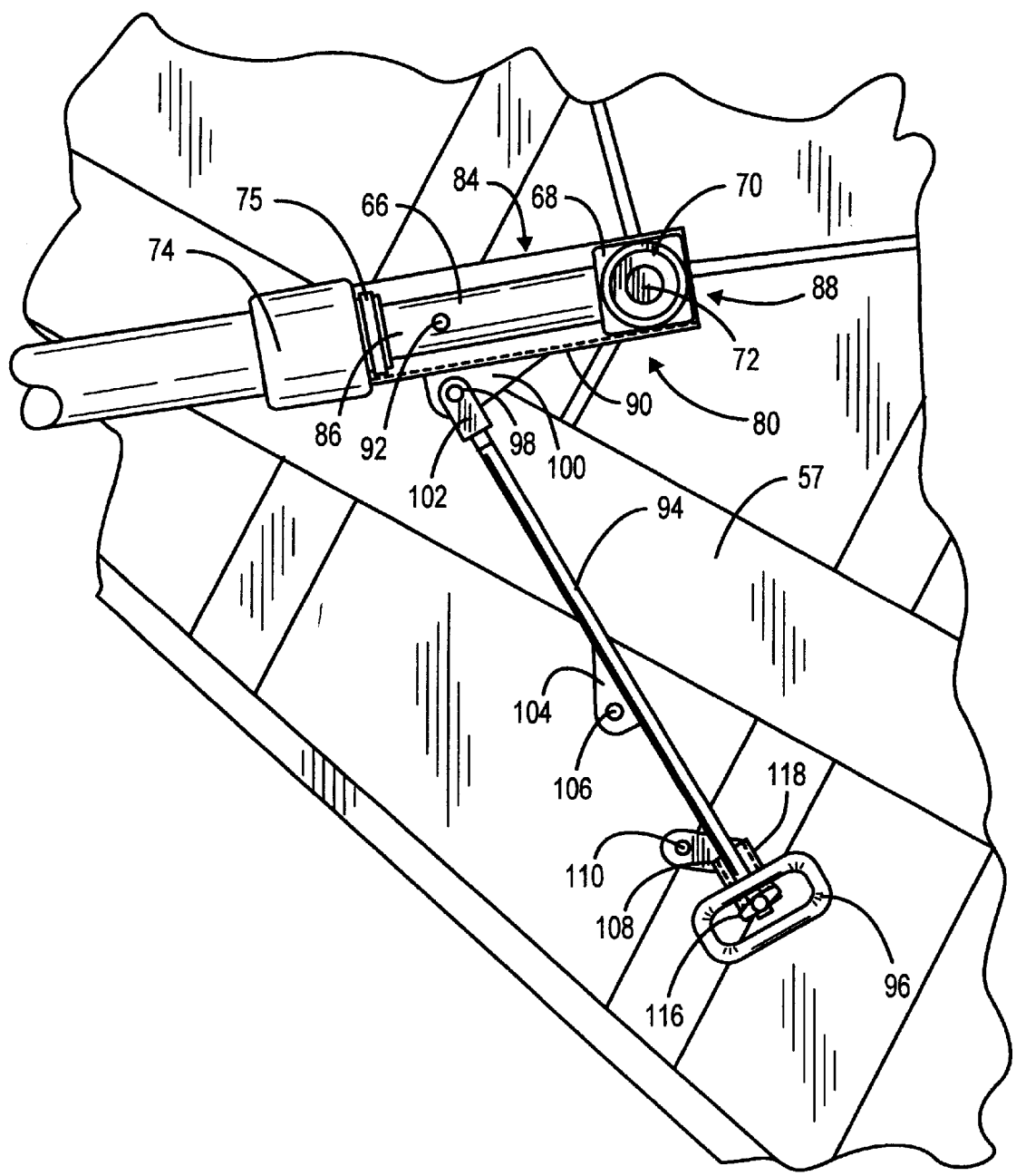
FIG. 4 depicts an enlarged view of the operating rod handle mechanism shown with the collar in the fully deployed position.

As pictured in FIGS. 2–4, each locking system of the invention features a collar blocking device in the form of a three-sided box-like or collar, generally at 80, having a hollow interior and an open upper side or gap 84, open ends 86, 88 and a bottom plate 90. The fixed end 88 of the collar 80 is also journaled to rotate about the shaft 72. One or more buttons or bumper devices of nylon or another non-abrasive material are provided as at 92 to preclude direct contact between the collar 80 and the polished, smooth cylinder or piston rod 66. The interior gap of the collar 80 is made smaller than the collar 74 and gland nut 75.

Figure 5A:
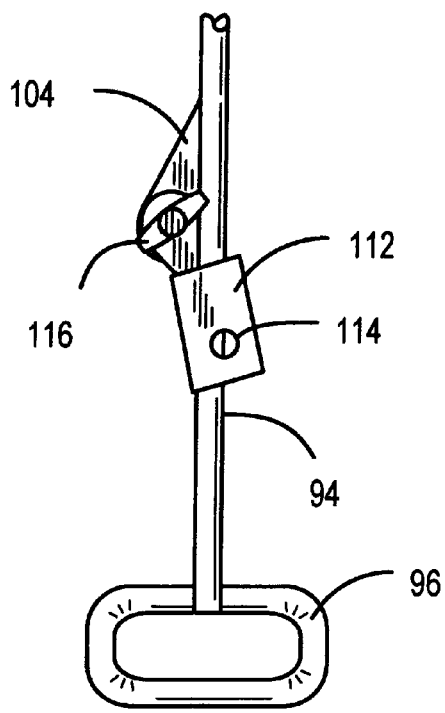
FIGS. 5A and 5B are greatly enlarged fragmentary views showing the handle retaining system in the fully withdrawn or retracted position and the fully advanced or deployed position, respectively.
Figure 5B:
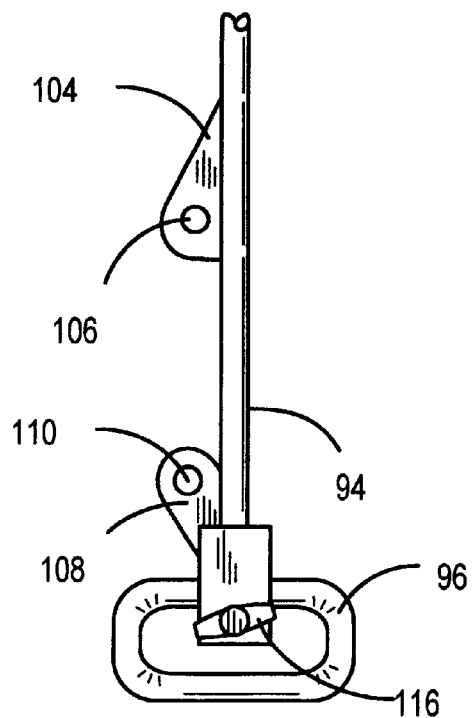
Figure 6:
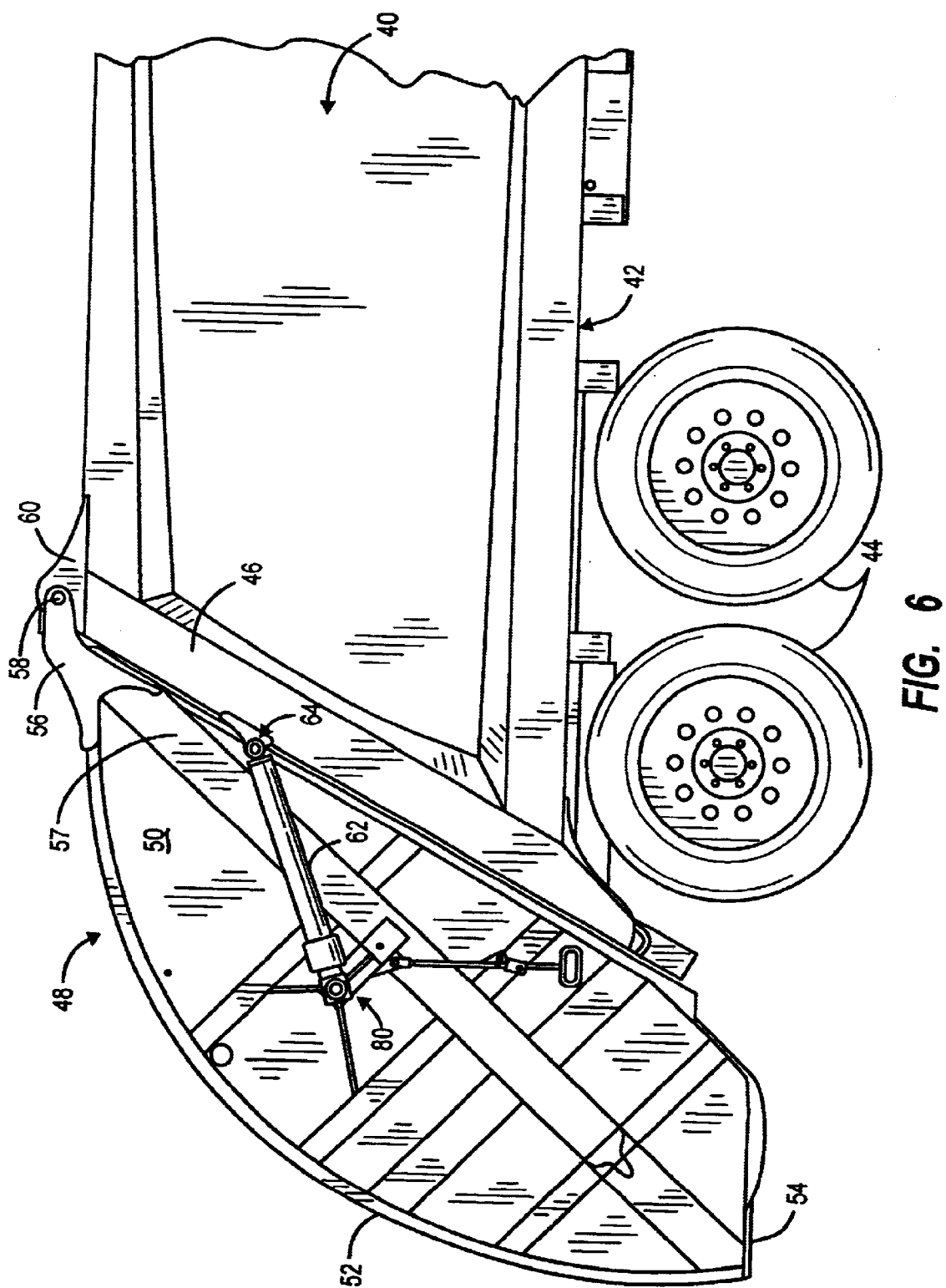
FIG. 6 is a view similar to FIG. 2 depicting the opposite side of the vehicle.

The collar is operated by a manually-operated rod 94 with handle 96 attached by a swivel joint at 98 to a flange or tab member 100 fixed to the collar 80 using an attachment member 102 threaded over the end of rod 94. As best seen in FIG. 5B, the rod 94 is also provided with a tab 104 fixed thereto and having an opening 106 and a corresponding aligned tab 108 with opening 110 is fixed to the tailgate 48. A further plate member 112 having an opening 114 is fixed in spaced relation to the tailgate and a locking thumb pin 116 is provided which may be connected to the tailgate by a short length of chain (not shown) in a conventional fashion. As is evident, particularly from FIG. 4, the free or handle end of the rod is threaded slidably through a short, hollow member 118 which retains the rod behind the member 112.

As can be seen from the figures, when the collar 80 is not in use, the rod 94 is fully withdrawn and the collar 80 pivoted free of the rod 66. The holes 106 and 110 align (FIGS. 2 and 5A) and the thumb pin 116 can be inserted to lock or secure the rod 94 in this position. Conversely, when the rod 94 is advanced fully (FIGS. 3, 4 and 5B), the collar 80 is in the deployed position and the thumb pin 116 can be inserted through the opening 114 in the member 112 to secure the handle 96 in the extended position. This also serves to hold each collar 80 in place prior to lowering the tailgate to wedge the system in place.

The operating sequence will now be explained. The sequence begins with the tailgate 48 in the closed, locked condition (FIG. 2) and the locking collar 80 with attached rod 94 and handle 96 fully retracted and locked in place by the locking thumb pin 116 (FIG. 5A). The tailgate 48 is unlocked and raised to a partially open position. The rod locking pin 116 is pulled releasing the rod 94 and handle 96 of the assembly which is then pushed up to pivot the locking collar 80 into place around the cylinder rod 66. The locking pin 116 is then reinstalled through opening 114 to hold the collar 80 in place about the cylinder rod 66. The collar placing process is then repeated on the opposite side of the tailgate so that both collar assemblies are held in place. The tailgate is then lowered to allow the tailgate cylinder rods to retract and wedge the locking collars in place against the collars 74 and/or the nuts 75.

To lower the tailgate or resume normal operation, the tailgate is raised slightly and the collar placing process is reversed for both assemblies moving both collars out of the way of the cylinder rods and pinning the handles in the retracted position. Thereafter, the tailgate can be operated normally.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A rear discharging refuse truck apparatus having a refuse collection body comprising:
   (a) a top-hinged pivoting tailgate;
   (b) a pair of spaced fluid-operated cylinders having extendable rods and being connected between the refuse collection body and the tailgate, one on either side thereof, such that extension of said cylinder rods opens the tailgate;
   (c) a pair of manually operated cylinder locking systems, one associated with each of said cylinders, to prevent retraction of said cylinder rods beyond a fixed distance regardless of loss of fluid pressure in said cylinders to maintain the tailgate in a partially opened state, each said cylinder locking system further including:
      (1) a locking collar that, when advanced to a locking position, fits over a portion of said cylinder rod and has a length that determines a minimum rod extension distance; and
      (2) a hand operated assembly for manually advancing and withdrawing said locking collar from said locking position over said cylinder rod.

2. An apparatus as in claim 1 for use with a rear-loading refuse truck.

3. An apparatus as in claim 1 wherein the cylinders are single-acting hydraulic cylinders.

4. A rear discharging refuse truck apparatus having a refuse collection body comprising:
   (a) a top-hinged pivoting tailgate;
   (b) a pair of spaced fluid-operated cylinders having extendable rods and being connected between the refuse collection body and the tailgate, one on either side thereof, such that extension of said cylinder rods opens the tailgate;
   (c) a pair of manually operated cylinder locking systems, one associated with each of said cylinders, to prevent retraction of said cylinder rods beyond a fixed distance regardless of loss of fluid pressure in said cylinders to maintain the tailgate in a partially opened state, each said cylinder locking system further including:
      (1) a locking collar that, when advanced to a locking position, fits over a portion of said cylinder rod and has a length that determines a minimum rod extension distance; and
      (2) an operating assembly for advancing and withdrawing said locking collar from said rod comprising a reciprocating rod and handle system connected to said locking collar for advancing and withdrawing said locking collar from said cylinder rod.

5. An apparatus as in claim 4 wherein said locking collar is pivotally mounted to said tailgate.

6. An apparatus as in claim 4 further comprising a system for locking said operating assembly in an advanced and in a retracted position.

7. An apparatus as in claim 5 further comprising a system for locking said operating assembly in an advanced and in a retracted position.

8. An apparatus as in claim 6 wherein said system for locking said operating assembly in said advanced and retracted position includes a locking pin.

9. An apparatus as in claim 7 wherein said system for locking said operating assembly in said advanced and retracted position includes a locking pin.

10. An apparatus as in claim 4 further comprising a pivot joint connecting said rod to said locking collar.

11. An apparatus as in claim 5 further comprising a pivot joint connecting said rod to said locking collar.

12. An apparatus as in claim 4 for use with a rear loading refuse truck.

13. An apparatus as in claim 4 wherein the cylinders are single-acting hydraulic cylinder.

14. A rear discharging refuse truck apparatus having a refuse collection body comprising:
   (a) a top-hinged pivoting tailgate;
   (b) a pair of spaced fluid-operated cylinders having extendable rods and being connected between the refuse collection body and the tailgate, one on either side thereof, such that extension of said cylinder rods opens the tailgate;
   (c) a pair of manually operated cylinder locking systems, one associated with each of said cylinders, to prevent retraction of said cylinder rods beyond a fixed distance regardless of loss of fluid pressure in said cylinders to maintain the tailgate in a partially opened state, each said cylinder locking system further including:
      (1) a locking collar that, when advanced to a locking position, fits over a portion of said cylinder rod and has a length that determines a minimum rod extension distance wherein said locking collar is pivotally mounted to said tailgate; and
      (2) an operating assembly for advancing and withdrawing said locking collar from said rod.

15. An apparatus as in claim 14 further comprising a system for locking said operating assembly in an advanced and in a retracted position.

16. An apparatus as in claim 15 wherein said system for locking said operating assembly in said advanced and retracted position includes a locking pin.

* * * * *